United States Patent [19]

Stegmaier

[11] 3,774,713
[45] Nov. 27, 1973

[54] INSTRUMENT PANEL OF A MOTOR VEHICLE

[75] Inventor: Wilhelm R. Stegmaier, Stuttgart, Germany

[73] Assignee: Daimler-Benz Aktiengesellshaft, Stuttgart, Germany

[22] Filed: Aug. 26, 1971

[21] Appl. No.: 175,171

[30] Foreign Application Priority Data
Aug. 26, 1970 Germany............... P 20 42 220.2

[52] U.S. Cl. .............................. 180/90, 280/150 B
[51] Int. Cl. ...................... B60k 35/00, B60r 21/02
[58] Field of Search....................... 180/90; 296/70; 280/150 B, 150 AB

[56] References Cited
UNITED STATES PATENTS
3,632,136   1/1972   Foltz............................. 280/150 AB

| | | |
|---|---|---|
| 3,498,402 | 3/1970 | Barenyi................................. 180/90 |
| 3,341,248 | 9/1967 | Barenyi et al..................... 180/90 X |
| 3,602,327 | 11/1971 | Barenyi................................. 180/90 |
| 3,380,548 | 4/1968 | Bauer.................................... 180/90 |

*Primary Examiner*—Kenneth H. Betts
*Attorney*—Craig, Antonelli and Hill

[57] ABSTRACT

An instrument panel in a motor vehicle with a padded projection essentially rectangularly shaped in cross section and protruding into the vehicle interior, which includes an essentially obliquely downwardly extending support anchored in the foot space of the vehicle, and in which the entire surface of the projection as also essential parts of the surface of the support are covered by a padding, preferably of foamed material while the walls of the projection as well as the support carrying the padding are permanently deformable independently of one another under the force of an impact of a passenger.

16 Claims, 6 Drawing Figures

INVENTOR
WILHELM R. STEGMAIER

BY Craig, Antonelli & Hill
ATTORNEY

INVENTOR
WILHELM R. STEGMAIER

INSTRUMENT PANEL OF A MOTOR VEHICLE

The present invention relates to the instrument panel in a motor vehicle with a padded projection protruding essentially rectangularly shaped into the vehicle interior in the longitudinal cross section of the vehicle, which includes an essentially obliquely downwardly extending support anchored in the foot space.

With the known constructions of the instrument boards or panels of motor vehicles, two types of injuries occurred in particular in case of collisions. In one case, the bodies of the passengers were pushed under the instrument panel. Then, in particular, inthrathoracal injuries and knee injuries occurred during the so-called submersion effect. In the other case, in particular the upper body of a passenger was thrown forwardly and impinged during the so-called jack knife effect with the head against the upper edge of the instrument panel whereby typical intracranial injuries were the consequences. These injuries also occurred when the instrument panels were padded in accordance with the presently existing requirements as regards internal safety.

The aim of the present invention is to avoid the submersion effect as also the jack-knife effect and to guide the body of a passenger forwardly in case of a collision as much as possible in the upright position because the body is thereby capable of being exposed during the impact phase to higher absolute loads by the instrument panel since the specific surface pressure is reduced over individual parts of the body as large body surfaces are supported simultaneously.

The objects of the present invention are fulfilled in that both the entire surface of the projection of the instrument panel protruding deeply into the vehicle interior as also essential parts of the surface of a support are covered with a continuous padding, preferably of foamed material or the like, and the walls of the projection carrying the padding as well as the support are permanently deformable independently of one another under the force of the impact of the passenger. A functional separation of the instrument panel into two controllably deformable areas with different tasks is achieved thereby.

According to a further feature and development of the present invention, the support may form a step by means of more or less inclined and at least approximately horizontally extending sections, into which penetrate the knee of the passengers during a collision and which is padded particularly heavily. The horizontal section of the support wall may thereby be constructed meander-shaped so that it is drawn apart during a collision whereas the other sections of the supporting wall are crumbled together. A relatively early impact of the knee area and a controlled forward movement of the body torso tract is achieved by such a construction of the instrument panel without significant inclination of the torso and therewith an optimum position of the body is attained in the trauma-active phase of the collision when maximum forces act on the different body regions.

Accordingly, it is an object of the present invention to provide an instrument panel for motor vehicles which avoids the aforementioned shortcomings and drawbacks encountered in the prior art.

Another object of the present invention resides in an instrument panel of a motor vehicle which greatly increases the safety of the passengers in case of collisions.

Still another object of the present invention resides in an instrument panel for a motor vehicle which avoids effectively both the submersion and jack-knife effects in case of collisions.

A still further object of the present invention resides in an instrument panel which permits the body of the passenger to slide forwardly substantially in an upright position while reducing the specific surface pressures on individual body parts.

These and further objects, features, and advantages of the present invention will become more apparent from the following description when taken in connection with the accompanying drawing, which shows, for purposes of illustration only, one embodiment in accordance with the present invention, and wherein.

Figure 1:
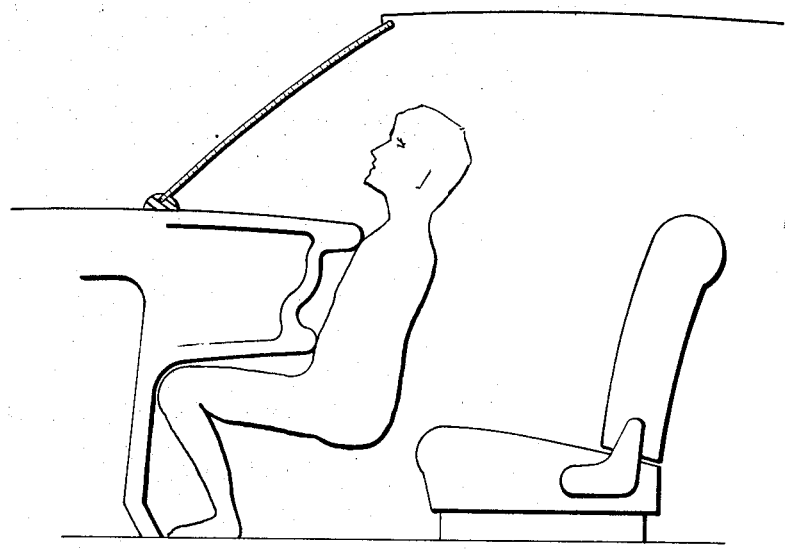
FIG. 1 is a schematic side view illustrating the so-called submersion effect during a collision in a motor vehicle of prior art construction.

Referring now to the drawing wherein like reference numerals are used throughout the various views to designate like parts and more particularly to FIGS. 3–6, an instrument panel generally designated by reference numeral 4 is installed on the inside of a motor vehicle 1 having the seat 2 and the passenger 3. The instrument panel 4 has an essentially rectangularly shaped cross section, as viewed in these figures, and projects with a protruding projection 5 deeply into the vehicle interior 6. The projection 5 includes supporting walls 7 permanently deformable under pressure during a collision by the impact of the passenger 3, preferably of sheet metal, steel plating or the like, which form the functional area 8 of the instrument panel. A further functional area 9 is formed by a support 11 anchored in the foot space which adjoins the rearward lower edge 12, as viewed in the driving direction, of the walls 7 of the projection 5. This support 11 is composed of several sections, namely, of an inclined and rounded-off section 13, of a horizontally extending meander-shaped section 14 which during the impact of passengers, is permanently deformable due to tension of a vertically or strongly inclined section 15 adjoining the same and of a less steeply extending section 16 which is anchored at a body wall 17 in the foot space. The essential parts of the thus constructed instrument panel are covered with a padding 20, preferably of any known foamed material or the like. Thus, the horizontal section 18 and the adjoining rounded-off section 19, passing over the vertical direction, of the walls 7 of the projection 5 and the sections 13 to 15 as also a part of the section 16 carry a good padding. This padding is particularly heavy within the area between the sections 14 and 15 of the support 11 which forms a step 21 and may completely fill out the area of the step.

It is therefore essential in the present invention that the functional areas 8 and 9 represent two controlled deformable areas, but each having a different task. Thus, the area 8 is intended as an impact zone for the thorax whereas the functional area 9 represents the impact zone for the knees and the upper part of the shank (leg) of the passenger 3. Each of these areas 8 and 9 has a deformation characteristic matched to the biomechanical tolerance of these body zones. Accordingly, also the paddings in the two functional areas 8 and 9 are matched to their functions and are constructed differently. The two functional areas 8 and 9 have up to a certain degree independent tasks, i,e., if during a frontal collision, the impact of the knee occurs prior to that of the thorax, then initially only the functional area 9 is deformed.

Figure 2:
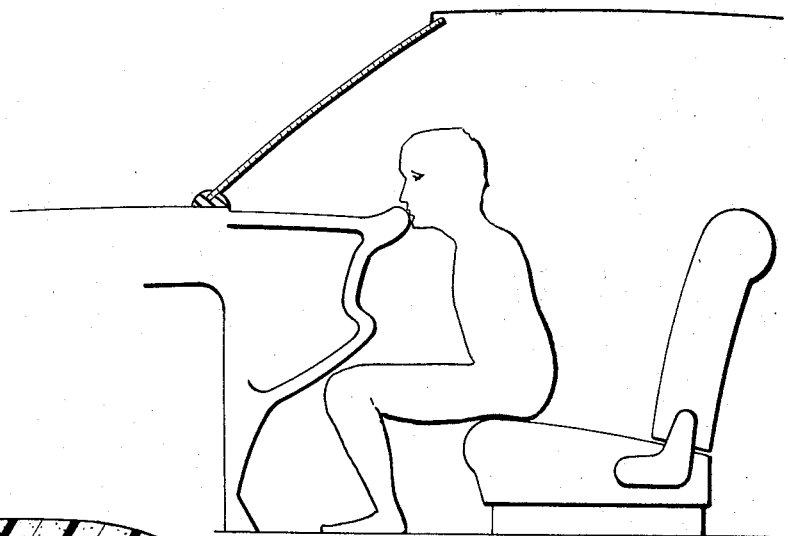
FIG. 2 is a schematic side view, similar to FIG. 1, illustrating the jack-knife effect during a collision in a motor vehicle of another known construction.
Figure 3:
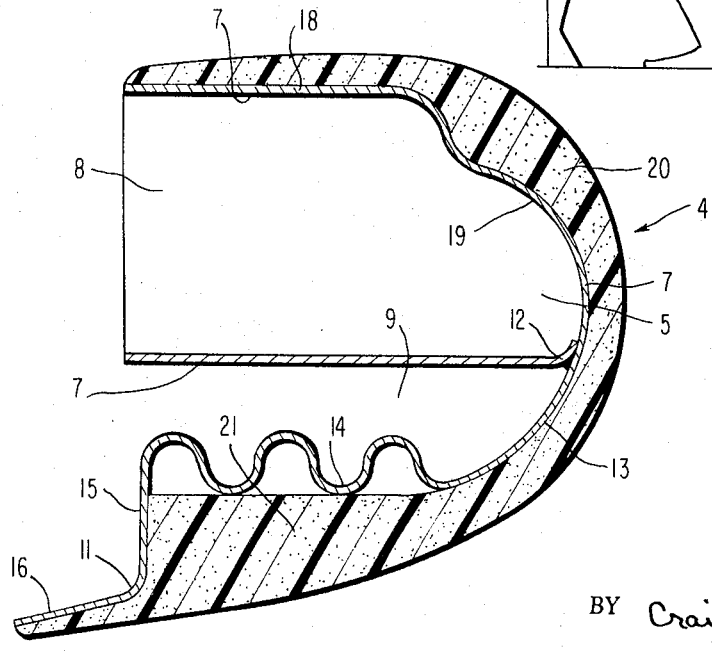
FIG. 3 is a cross-sectional view in the longitudinal direction of the motor vehicle through an instrument panel in accordance with the present invention.
Figure 4:
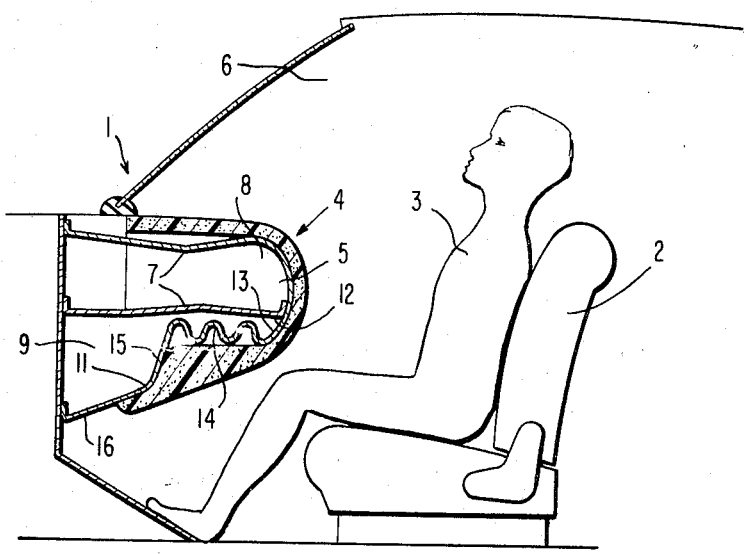
FIGS. 4–6 are schematic side views, partially in cross section, and illustrating the individual phases during a collision of a vehicle which is equipped with an instrument panel according to the present invention.
Figure 5:
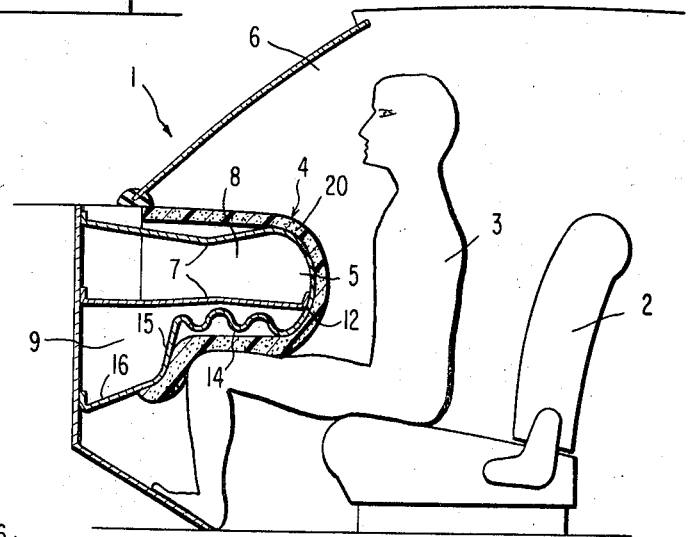
Figure 6:
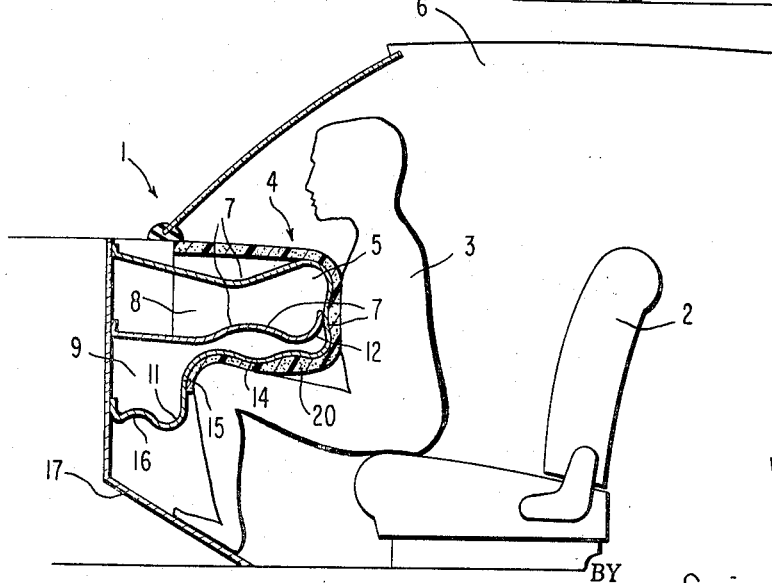

Consequently, if the functional areas 8 and 9 are adequately matched to the decelerating mass parts of the passenger as regards the force -, path-, and deformation-characteristics, then a controlled movement of the upper body and of the pelvis of the passengers in the forward direction is achieved. The body is thereby also uniformly loaded by the matched padding, and both a sliding-under (FIG. 1) as also a tilting-forward (FIG. 2) of the body is avoided. Accordingly, the so-called second phase of the collision takes place according to the progress of the collision illustrated in FIGS. 5 and 6 whereas FIGS. 3 and 4 illustrate the situation and especially also the construction of the walls of the instrument panel as well as of the padding there of prior to the collision.

Consequently, taking into consideration these tasks, various modifications can be employed in the construction of the present invention in connection with the construction and design of the walls of the instrument panel. Thus, for example, sections of the projection or of the support or both may be so constructed that these sections are collapsed together or are also drawn apart by a meander-shaped construction.

While I have shown and described only one embodiment in accordance with the present invention, it is understood that the same is not limited thereto, but is susceptible of numerous changes and modifications as known to those skilled in the art, and I therefore do not wish to be limited to the details shown and described herein but intend to cover all such changes and modifications as are encompassed by the scope of the appended claims.

I claim:

1. An instrument panel in a motor vehicle comprising a projection means projecting into a vehicle interior and having a rectangularly shaped cross-section in a longitudinal plane of the vehicle, said projection means including permanently deformable walls, an essentially obliquely downwardly extending support means anchored in the vehicle foot space below the projection means, said support means including permanently deformable walls, and padding means covering substantially the entire surface of the projection means and the support means wherein the deformable walls of each of the projecting means and the support means are independently deformable with respect to one another under the force of impact of a passenger.

2. An instrument panel according to claim 1, characterized in that the projection means protrudes relatively deeply into the vehicle interior.

3. An instrument panel according to claim 2, characterized in that the padding means consists of foamed material.

4. An instrument panel according to claim 2, characterized in that the padding means is a continuous padding means.

5. An instrument panel according to claim 4, characterized in that at least one of the projection and support means include sections such that the sections can be crumbled together under the force of an impact of a passenger.

6. An instrument panel according to claim 5, characterized in that said sections are formed by parts of the projection and support means.

7. An instrument panel according to claim 5, characterized in that meander-shaped sections are disposed in at least one of the projection and support means wherein said meander-shaped sections can be drawn apart under the force of the impact of a passenger.

8. An instrument panel according to claim 7, characterized in that said meander-shaped sections are formed by portions of both said projection and support means.

9. An instrument panel according to claim 7, characterized in that the support means includes inclined and at least approximately horizontally extending sections forming a step into which the knees of the passenger enter during a collision, said sections are padded particularly strongly, and the horizontal section is meander-shaped to be drawn apart during a collision whereas the other sections of the support means are crumbled together.

10. An instrument panel according to claim 9, characterized in that the padding means extends beyond the step section.

11. An instrument panel according to claim 1, characterized in that at least one of the projection and support means include sections such that the sections can be crumbled together under the force of an impact of a passenger.

12. An instrument panel according to claim 11, characterized in that said sections are formed by parts of the projection and support means.

13. An instrument panel according to claim 1, characterized in that meander-shaped construction sections are disposed in at least one of the projection and support means wherein said meander-shaped sections can be drawn apart under the force of the impact of a passenger.

14. An instrument panel according to claim 13, characterized in that said meander-shaped sections are formed by portions of both said projection and support means.

15. An instrument panel according to claim 1, characterized in that the support means includes inclined and at least approximately horizontally extending sections forming a step into which the knees of the passenger enter during a collision, said sections are padded particularly strongly, and the horizontal section is meander-shaped to be drawn apart during a collision whereas the other sections of the support means are crumbled together.

16. An instrument panel according to claim 15, characterized in that the padding means extends beyond the step section.

* * * * *